US010451357B2

(12) United States Patent
Kraneis

(10) Patent No.: US 10,451,357 B2
(45) Date of Patent: Oct. 22, 2019

(54) MIXING CONTAINER OF A LATENT HEAT STORAGE UNIT AND METHOD FOR THE OPERATION THEREOF

(71) Applicant: OPTIMIZE GMBH, Aachen (DE)

(72) Inventor: Wulf Kraneis, Rossdorf (DE)

(73) Assignee: OPTIMIZE GMBH, Aachen (DE)

( * ) Notice: Subject to any disclaimer, the term of this patent is extended or adjusted under 35 U.S.C. 154(b) by 203 days.

(21) Appl. No.: 15/541,869

(22) PCT Filed: Jan. 5, 2016

(86) PCT No.: PCT/DE2016/000003
§ 371 (c)(1),
(2) Date: Jul. 6, 2017

(87) PCT Pub. No.: WO2016/110288
PCT Pub. Date: Jul. 14, 2016

(65) Prior Publication Data
US 2018/0017340 A1 Jan. 18, 2018

(30) Foreign Application Priority Data
Jan. 8, 2015 (DE) .................. 10 2015 000 238

(51) Int. Cl.
F28D 20/02 (2006.01)
F28D 3/02 (2006.01)
(Continued)

(52) U.S. Cl.
CPC ........... *F28D 20/025* (2013.01); *B01D 12/00* (2013.01); *B01F 5/0403* (2013.01);
(Continued)

(58) Field of Classification Search
CPC ...... F28D 20/02; F28D 20/025; F28D 20/026; F28D 20/0056; F28D 3/02; Y02E 60/145;
(Continued)

(56) References Cited

U.S. PATENT DOCUMENTS 2,101,953 A * 12/1937 Oman .................. F25D 16/00
165/104.31
2,631,835 A * 3/1953 Jones .................. F28D 19/02
159/1.1
(Continued)

FOREIGN PATENT DOCUMENTS

DE       2607168 C3     4/1981
DE       4314509 A1 *  11/1994  ............ F24F 5/0017
(Continued)

OTHER PUBLICATIONS

WO-0119486-A1—Knselmann Uwe (Year: 2001).*
International Search Report for Application No. PCT/DE2016/000003 dated Jun. 13, 2016.

*Primary Examiner* — Cassey D Bauer
*Assistant Examiner* — Jenna M Hopkins
(74) *Attorney, Agent, or Firm* — Tarolli, Sundheim, Covell & Tummino L.L.P.

(57) ABSTRACT

A method is disclosed for the operation of a mixing container of a latent heat storage unit, whereby a heat storage fluid changes between a liquid phase and a solid phase, and has a higher density than a heat transfer fluid. In this method, by virtue of the geometry of the mixing container as well as the flow path of the heat storage fluid and the heat transfer fluid through the mixing container, the solid and the liquid heat storage fluids are concentrated after being mixed with the heat transfer fluid and they are subsequently separated from the heat transfer fluid at a boundary layer and withdrawn from the heat storage fluid by a flow induced below the boundary layer in the direction of an ice reservoir via a pipeline, and subsequently, the liquid heat storage fluid is separated from the solid heat storage fluid in the ice reservoir.

15 Claims, 4 Drawing Sheets

(51) Int. Cl.
*F24F 5/00* (2006.01)
*B01F 5/04* (2006.01)
*F28D 20/00* (2006.01)
*B01D 12/00* (2006.01)

(52) U.S. Cl.
CPC .......... *F24F 5/0017* (2013.01); *F24F 5/0021* (2013.01); *F28D 3/02* (2013.01); *F28D 20/0056* (2013.01); *F28D 20/02* (2013.01); *F28D 20/026* (2013.01); *F25B 2400/23* (2013.01); *Y02E 60/145* (2013.01)

(58) Field of Classification Search
CPC ... F24F 5/0017; F24F 5/0021; F25B 2400/23; B01D 12/00; B01F 5/0403; F25F 2005/0025; F25F 2005/0028; F25D 17/02
USPC ............ 165/104.11, 104.12, 104.17, 104.21; 62/434
See application file for complete search history.

(56) References Cited

U.S. PATENT DOCUMENTS

| | | | | |
|---|---|---|---|---|
| 4,099,557 A * | 7/1978 | Bricard | ................. | F28D 20/025 126/400 |
| 4,111,260 A * | 9/1978 | Bricard | ................. | F28D 20/025 126/400 |
| 4,300,622 A * | 11/1981 | Lindner | ................. | F24D 11/00 126/643 |
| 4,383,576 A * | 5/1983 | Bricard | ................. | F28D 20/025 165/104.17 |
| 4,408,654 A * | 10/1983 | Doomernik | ............. | F25D 17/02 165/10 |
| 4,535,837 A * | 8/1985 | Ishii | ..................... | F28D 20/025 126/618 |
| 4,596,120 A * | 6/1986 | Knodel | .................. | F25D 16/00 165/104.17 |
| 4,753,080 A * | 6/1988 | Jones | ...................... | F25B 13/00 62/435 |
| 4,840,652 A * | 6/1989 | Simon | ...................... | F25C 1/00 62/123 |
| 4,864,831 A * | 9/1989 | Hino | ..................... | F24F 5/0017 62/123 |
| 5,207,075 A * | 5/1993 | Gundlach | ............. | F24F 5/0017 237/2 B |
| 5,507,858 A * | 4/1996 | Jepson | ............... | B01D 19/0031 95/262 |
| 5,572,883 A * | 11/1996 | Roberts | ................... | F25D 16/00 165/110 |
| 6,620,221 B1 * | 9/2003 | Lenzing | ............ | B01D 19/0031 95/262 |
| 6,681,593 B1 * | 1/2004 | Gundlach | ............... | F25B 30/06 62/324.1 |
| 2004/0011073 A1 * | 1/2004 | Blackstone | ........ | A41D 13/0055 62/420 |
| 2005/0178138 A1 * | 8/2005 | Blackstone | ........ | A41D 13/0025 62/259.3 |
| 2009/0044932 A1 * | 2/2009 | Blackstone | ........ | A41D 13/0025 165/158 |
| 2012/0036871 A1 * | 2/2012 | Folger | ........................ | B01J 2/02 62/66 |
| 2012/0090339 A1 * | 4/2012 | Ohlsson | .................... | F04F 1/18 62/119 |
| 2012/0132393 A1 * | 5/2012 | Pilebro | ............... | F28D 20/0034 165/45 |
| 2012/0168126 A1 * | 7/2012 | Tanaka | .................. | F28D 20/025 165/104.11 |
| 2015/0241137 A1 * | 8/2015 | France | .................. | F28D 20/021 126/619 |
| 2018/0292097 A1 * | 10/2018 | Specter | .................... | F24F 11/30 |

FOREIGN PATENT DOCUMENTS

| | | | | |
|---|---|---|---|---|
| DE | 4314509 A1 | 11/1994 | | |
| DE | 19839867 A1 * | 5/2000 | ............ | F25B 30/06 |
| DE | 19944189 C1 | 4/2001 | | |
| DE | 10 2013 208974 A1 | 11/2014 | | |
| FR | 2497333 A1 * | 7/1982 | ................ | F28C 3/08 |

* cited by examiner

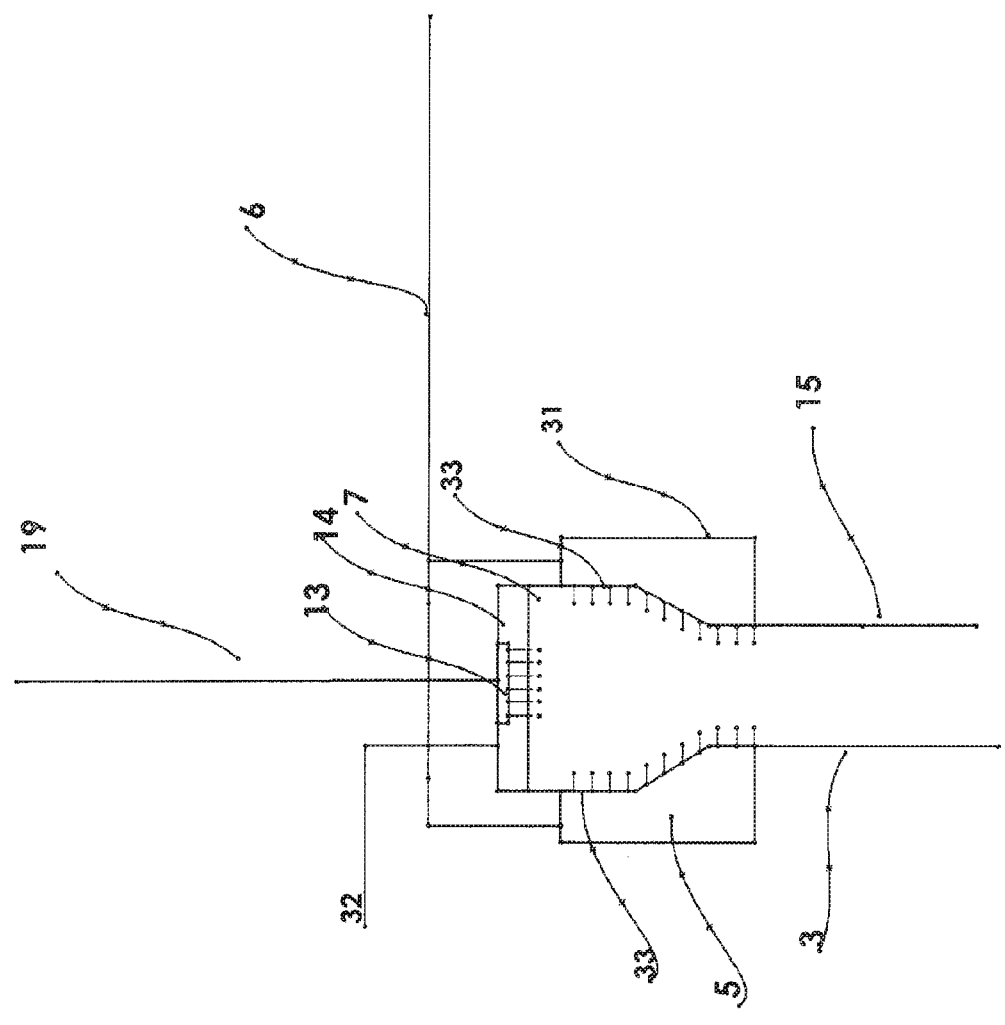

MIXING CONTAINER OF A LATENT HEAT STORAGE UNIT AND METHOD FOR THE OPERATION THEREOF

RELATED APPLICATIONS

The present invention is a U.S. National Stage under 35 USC 371 patent application, claiming priority to Serial No. PCT/DE2016/000003, filed on 5 January 2016; which claims priority of DE 10 2015 000 238.4, filed on 8 Jan. 2015, the entirety of both of which are incorporated herein by reference.

TECHINCAL FIELD

The invention relates to a method for the operation of a mixing container of a latent heat storage unit having a connected ice reservoir, whereby a heat storage fluid changes between a liquid phase and a solid phase and, when it is in the liquid phase, it is mixed with a heat transfer fluid, whereby melting heat is transferred between the heat storage fluid and the heat transfer fluid, whereby the liquid heat storage fluid is non-soluble in the heat transfer fluid, and whereby the liquid heat storage fluid has a higher density than the heat transfer fluid, and whereby, after the heat transfer from the heat storage fluid to the heat transfer fluid, the heat transfer fluid and the heat storage fluid are then separated once again.

BACKGROUND

Latent heat storage units with or without mixing containers are the subject matter of numerous patents or patents applications such as, for example, German patent application DE 43 14 509 A1 or German patent specification DE 2607168 C3 as well as U.S. Pat. No. 4,111,260 A, German patent application DE 10 2013 208974 A1 and U.S. Pat. Appln. No. 2012/168126 A1. With methods of this type, the essential step is that, during the withdrawal of energy from the heat storage unit, the solidifying or solidified heat storage fluid is reliably and completely separated from the liquid heat storage fluid and especially, both of them are completely separated from the heat transfer fluid, since the heat transfer fluid is constantly being cooled to temperatures that are below the solidification temperature of the heat storage fluid, and consequently, the external heat exchanger that serves to cool the heat transfer fluid becomes clogged with solid heat storage fluid if the heat storage fluid is not removed completely from the heat transfer fluid. The reliable separation of solid and liquid heat storage fluid is of importance since liquid heat storage fluid is constantly needed in order to be brought into contact with the heat transfer fluid, whereby solid heat storage fluid only disrupts this process if it is unnecessarily moved and if it also becomes mixed with the heat transfer fluid once again. Moreover, as a rule, the heat transfer fluid—in this case, preferably kerosene or octane—is much more expensive than the heat storage fluid—in this case, preferably water—so that the amount of heat transfer fluid in the process should be kept as small as possible and above all, the zones where heat transfer fluid and heat storage fluid are present in mixed form should be kept as small as possible. German patent application DE 43 14 509 A1 repeatedly points out that the above-mentioned separation problem is of the essence for the method and for the device. In German patent specification DE 2607168 C3, it was recognized that, in the final analysis, the separation of heat transfer fluid and heat storage fluid is the crux of all of the methods that deal with this topic. If this separation cannot be achieved with simple measures, then, for all practical purposes, these methods cannot be used, which is why none of the patented methods have found use on a large scale. German patent application DE 43 14 509 A1 also describes how a separation of heat transfer fluid and heat storage fluid can be achieved by means of a coalescer.

U.S. Pat. No. 4,111,260 A does not discuss at all how the heat transfer fluid and the heat storage fluid can be separated from each other. U.S. Pat. Appln. No. 2012/168126 A1 does not encounter the problem of the separation of heat transfer fluid and heat storage fluid since there, the heat-storing material is enclosed in the heat storage container, as a result of which this construction entails the usual drawbacks that arise when heat is transferred from one fluid to another fluid or to a solid. German patent application DE 10 2013 208974 A1 does not elaborate upon the details of the separation of the heat storage fluid (or heat storage solid) and the heat transfer fluid, in addition to which this document relates to a different heat transfer fluid.

SUMMARY

The invention presented here does without a coalescer and solves the problem by means of a novel method that utilizes the geometry of the mixing container, along with a novel flow path for the heat transfer fluid and for the heat storage fluid specifically through this mixing container during the energy transfer.

Objective

This invention is based on the objective of configuring the mixing and de-mixing of a heat storage fluid and a heat transfer fluid in a mixing container of a latent heat storage unit in such a way that, after the liquid heat storage fluid and the liquid heat transfer fluid have been mixed together, a complete separation of the heat transfer fluid and of the liquid and solid heat storage fluids is carried out so that the solid heat storage fluid can be stored in a simple manner and the liquid heat storage fluid is always available to the process cycle, while the liquid heat transfer fluid is circulated without or almost without the addition of any solid heat storage fluid.

Solution

Before the backdrop of the prior-art methods, it is proposed according to the invention that, for mixing purposes, the heat transfer fluid be withdrawn from a circulation system and, after absorbing the solidification heat, that it be returned to the circulation system. In this context, the heat transfer fluid is always in liquid form and it is constantly being cooled, for example, by means of a heat pump that constantly releases useful heat to the hot side of the heat pump process.

In order for the heat storage fluid to be mixed, it is dispersed into many droplets. Rendering it in the form of droplets increases the surface area of the heat storage fluid relative to its volume so that the size of the heat-exchanging surface area increases accordingly as the mean droplet diameter decreases.

The heat storage fluid is placed into a mixing container whose top part is filled with heat transfer fluid or through which heat transfer fluid constantly flows and whose bottom part is filled with liquid heat storage fluid or through which heat storage fluid constantly flows, whereby preferably, a thin gas layer, e.g. air, is also captured in a bell between the outlet of the heat storage fluid leading into the mixing container and the surface of the heat transfer fluid, so that the exiting heat storage fluid cannot freeze at the outlet of the dripping device due to contact with the colder heat transfer fluid. Whereas the best and most uniform possible mixing of liquid heat transfer fluid and liquid heat storage fluid takes place in the upper part of the mixing container, in order to achieve the heat exchange between the two fluids and thus the generation of solid heat transfer fluid, a separation between the heat transfer fluid and the liquid or solid heat storage fluid is achieved in the lower part of the mixing container by virtue of the geometry of the mixing container and thus by virtue of the flow path through the mixing container. Due to the fact that the heat storage fluid, be it in its solid state or liquid state, has a higher density than the heat transfer fluid, it sinks in the latter, as a result of which liquid heat storage fluid and solid heat storage fluid are then constantly exiting at a boundary layer between the heat transfer fluid and the heat storage fluid in the mixing container and, according to the invention, said liquid and solid heat storage fluids are immediately carried away from the boundary layer at the site of the outflow and are then separated over the further course of their flow into a solid heat storage fluid and a liquid heat storage fluid, in such a way that solid heat storage fluid is stored in an ice reservoir, while the liquid heat storage fluid is once again available to the process.

In methods of this type, mixtures of heat transfer fluid as well as solid and liquid heat storage fluid often form at the boundary layer and these either can no longer be neatly separated from each other, as a result of which the envisaged process comes to a standstill, or else the solid heat storage fluid phase blocks the process inside the mixing container because the solid phase accumulates inside the mixing container and continues to build up to an ever greater extent. It is also often unavoidable that, due to the poor and particularly slow separation, substantial amounts of heat transfer fluid are bound near the boundary layer and are thus not available to the actual process, namely, the heat exchange in the mixing container. The invention presented here avoids precisely this situation.

BRIEF DESCRIPTION OF THE DRAWINGS

FIG. 4 illustrates an example of configuration for introducing heat transfer fluid.

DETAILED DESCRIPTION

Embodiment

Figure 1:
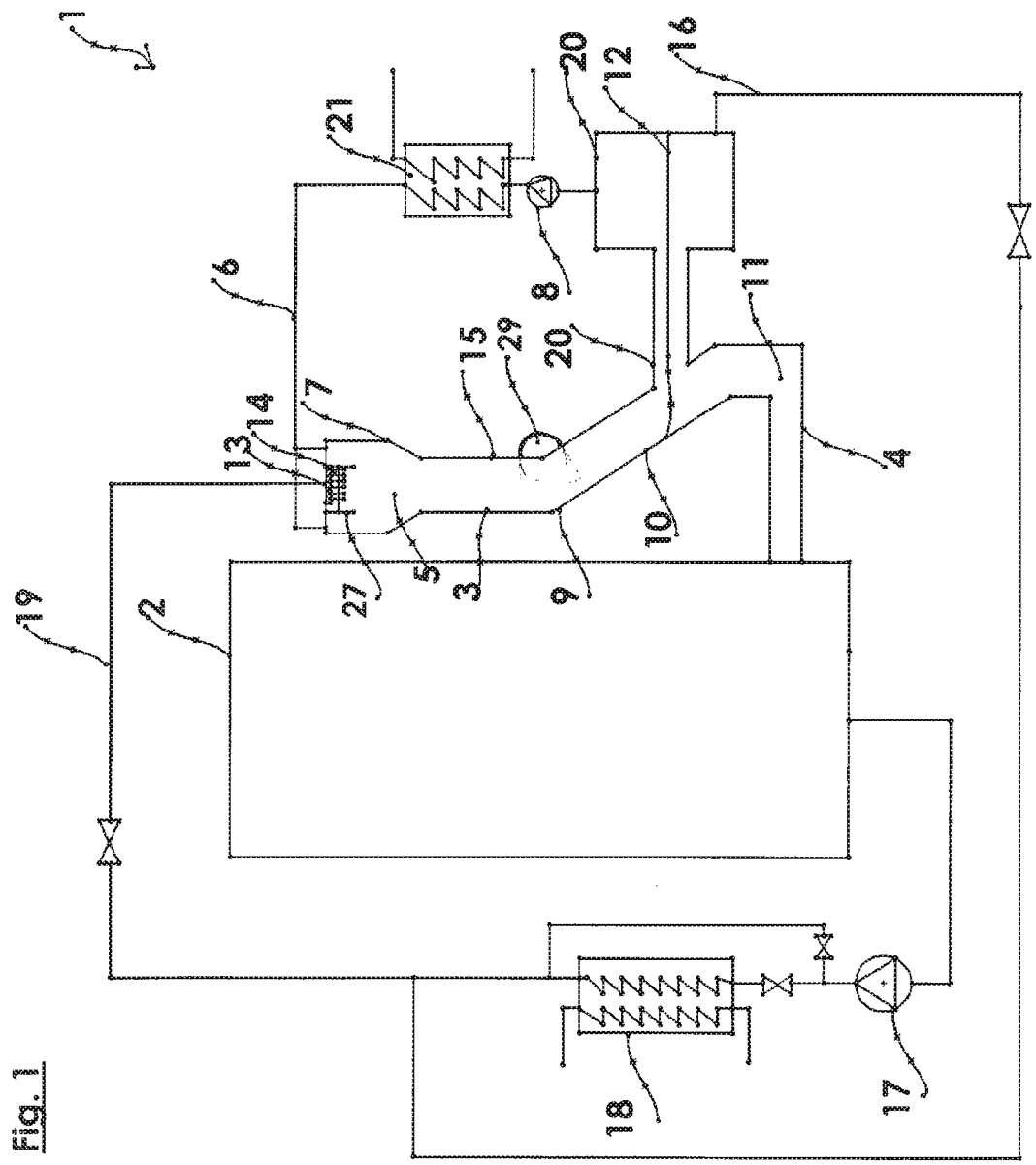
FIG. 1 illustrates an example of a latent heat storage unit with an icer reservoir.

FIG. 1 shows a latent heat storage unit 1 according to the invention with an ice reservoir 2. The ice reservoir 2 is, for example, a commercially available water reservoir suited for installation in the ground if it is desired that ambient heat should be absorbed by the reservoir or, for instance, for installation above ground where it should then be well insulated if the stored cold is to be made available to cooling processes later on. A mixing container 3 is connected to the ice reservoir 2 via a slightly descending or horizontally positioned or slightly ascending pipeline 4. A heat transfer fluid 5 is filled into, and flows through, an upper part 7 of the mixing container 3, whereby additional heat transfer fluid 5 is kept constantly flowing via a pipeline 6 into the upper part 7 of the mixing container and is withdrawn again from the mixing container 3 by means of a pump 8 (as an alternative, the flow direction can also be reversed by turning the pump 8, that is to say, the heat transfer fluid 5 is introduced into the mixing container 3 by the pump 8 and withdrawn from it via the pipeline 6). In this process, the heat transfer fluid 5 is constantly being cooled in a heat exchanger 21. According to the invention, the mixing container 3 is configured in such a way that, adjoining the upper part 7 of the mixing container, there is a perpendicular or almost perpendicular pipe 15 that first makes a bend 9 and then makes a transition to a sufficiently long incline 10. Instead of the bend 9, the change in the flow direction that is achieved by this bend 9 can also be accomplished by one or more partial elbows, a measure that has a positive effect on the friction losses of the flow. The angle 29 of the change in the flow between the flow exiting from the upper part 7 of the mixing container and the flow direction of the heat storage fluid 11 near the boundary layer 12 is between 92° and 178°. A liquid heat storage fluid 11 is introduced through a pipeline 19 via a dripping device 13 into the upper part 7 of the mixing container, whereby the upper part 7 of the mixing container is configured on the dripping device 13 in such a way that the dripping device 13 is situated in a gas cushion 14 under the bell 27 so that the liquid heat storage fluid 11 does not come into direct contact with the cold heat transfer fluid 5, as a result of which the dripping device 13 cannot freeze.

As an alternative to the above-mentioned introduction of heat transfer fluid 5 and heat storage fluid 11 into the upper part 7 of the mixing container, this introduction can also be configured as is shown in FIG. 4. Exactly as before, heat storage fluid 11 is introduced via a pipeline 19 into a dripping device 13 that is situated in a gas space 14 which can be formed by means of a filling and emptying line 32 and whose size can be adjusted. The upper part 7 of the mixing container is surrounded by an additional container 31 that tightly encloses the upper part 7 of the mixing container so that heat transfer fluid 5 is first introduced via the pipeline 6 into the container 31 and from there, via the permeable wall 33, into the upper part 7 of the mixing container. This wall can be made, for example, of plastic or metal, and can be highly perforated, and by the same token, the wall can be made of wire mesh or other liquid-permeable materials that permit a uniform passage of heat transfer fluid 5. This structure prevents ice from being deposited in the upper part 7 of the mixing container since the ice that forms underneath the dripping device 13 is kept away from the wall 33 by the heat transfer fluid 5 flowing from the outside into the upper part 7 of the mixing container.

The heat transfer fluid 11 flows downwards through the mixing container 3 within the heat transfer fluid 5 that is likewise flowing downwards and, by virtue of the geometry of the mixing container 3 and by virtue of the higher density of the heat transfer fluid 11, the latter is forced to become concentrated on the incline 10 and to flow over the incline 10 to the boundary layer 12, a process which then causes liquid and solid heat storage fluid 11 to exit at the bottom of the incline 10 at the height of the boundary layer 12, i.e. near the intersection of the boundary layer 12 with the incline 10. The mixing container 3 can be designed with a round cross section or, instead of the round cross section, it can have a rectangular cross section, or else it can have other cross sections that cause the heat storage fluid 11 to become concentrated at the bottom of the incline 10. The essential aspect is that the extension of the right-hand side of the pipe 15 still has to reach the incline 10 before reaching the boundary layer 12.

Inside the mixing container 3, in a lower horizontal part 20 of the mixing container 3, which is preferably configured with a round cross section (pipe) or else which can have other cross section shapes such as, for example, rectangular, the position of the boundary layer 12 is set in such a way that sufficient heat storage fluid 11 can flow through from the right to the left so that a sufficient flow 23 of the heat storage fluid (see FIG. 2) can be induced and so that the solid components of the heat storage fluid 11 that might still be present in the area of the boundary layer 12—whose lower part is situated in the flow 23 of the heat storage fluid, but whose upper part also projects slightly into the horizontal flow 24 of the heat transfer fluid 5—can be conveyed to the left in the direction of the outlet 25 (FIG. 2) from where these components then flow further in the direction of the ice reservoir 2. In the lower horizontal part 20 of the mixing container, liquid heat storage fluid 11 is constantly fed in from the right via a pipeline 16 so that the heat storage fluid 11 (solid and liquid) exiting from the boundary layer 12 is thus forced to flow into the lower part of the mixing container 3 and from there, further into the ice reservoir 2 via the pipeline 4 (see FIG. 2). The rate of the horizontal flow 24 of heat transfer fluid in the lower horizontal part 20 of the mixing container is set in such a manner that no heat storage fluid 11 can migrate in the direction of the pump 8 due to turbulence. In FIG. 1, the pipeline 4 runs briefly perpendicular downwards and then at an angle of 90° or slightly more than 90° counter to the perpendicular towards the left, although the pipeline 4 can also run downwards for a while at an angle of approximately 0° to 30° counter to the perpendicular and only then does it turn to the horizontal or almost horizontal position. The function of the pipeline 4 in the segment adjoining the mixing container 3 is to not only allow any heat transfer fluid 5 that might have been entrained in the area of the outlet 25 to once again rise to the top, but also to withdraw solid and liquid heat storage fluid 11 at the bottom as described above, whereby the virtually horizontal part of the pipeline 4 is preferably slightly slanted in the flow direction in order to offer an additional safeguard against any entrainment of heat transfer fluid 5 into the ice reservoir 2 which is situated above this connection of the pipeline 4 between the ice reservoir 2 and the mixing container 3, so as to be physically independent of the mixing container 3, that is to say, the ice reservoir 2 and the mixing container 3 can be at any desired distance from each other. After the solid and liquid heat storage fluids 11 have flowed into the ice reservoir 2, the solid heat storage fluid 11 separates from the liquid heat storage fluid 11 in the lower part of the ice reservoir 2 as a result of the density difference, whereby the solid heat storage fluid 11 flows upwards due to the low density and fills the reservoir, while the liquid heat storage fluid 11 is withdrawn at the bottom of the ice reservoir 2 and, by means of a pump 17 (FIG. 1) and optionally by means of a heat exchanger 18 (that serves to heat or cool the heat storage fluid 11, it is once again circulated via a pipeline 19 to the dripping device 13 and via the pipeline 16 to the lower horizontal part 20 of the mixing container. An ice-water mixture is present in the ice reservoir 2, and in the discharged state, the ice portion is very high whereas in the charged state, only water is contained there. Here, the term "charged state" refers to a state that is energetically higher than the "discharged state".

Figure 2:
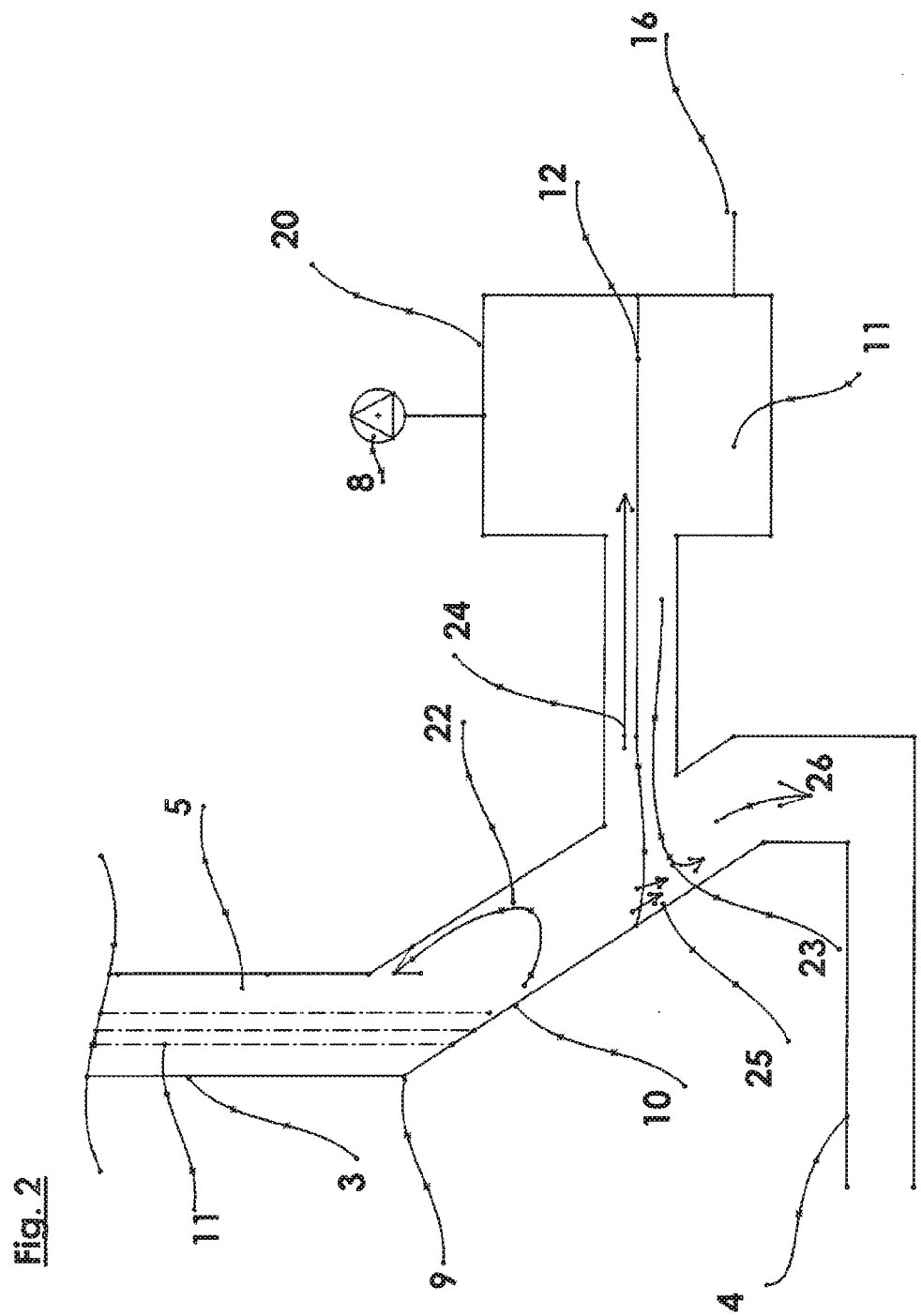
FIG. 2 illustrates an example of a portion of a latent heat storage unit with an ice reservoir.

Owing to the bend 9, i.e. a direction change in the mixing container 3, a recirculation zone 22 of heat transfer fluid and heat storage fluid is established in the pipe in the area of the incline 10, as is shown in FIG. 2. This recirculation zone 22 results in a longer retention time for the heat storage fluid 11 in the lower part of the mixing container 3, translating into a more prolonged heat exchange.

Moreover, in FIG. 2, the flow conditions in the mixing container 3 are shown once again in simplified form; the middle part of the mixing container 3, the horizontal lower part 20 of the mixing container and the transition to the pipeline 4 are all shown here. Liquid heat storage fluid 11 in the form of droplets comes from the upper part 7 of the mixing container. The droplets then fall downwards through the (flowing) heat transfer fluid 5 and reach the incline 10 or, depending on the configuration of the bend 9 or on the geometry of the mixing container 3, they enter the recirculation zone 22 from which they ultimately also reach the incline 10 together with the other droplets after having released their heat, in order to then penetrate the boundary layer 12 in the area of an outlet 25 in the solid and liquid states. The penetration of the boundary layer and thus the separation of the heat storage fluid 11 and the heat transfer fluid 5 functions on the basis of the vertical velocity component that the flow of the heat storage fluid 11 develops along the incline 10 and also on the basis of the higher density of the heat storage fluid 11 that conveys the heat storage fluid 11 downwards within the heat transfer fluid 5. The separation of the heat transfer fluid 5 is also aided by the fact that the flowing heat transfer fluid 5 has to diverge to the side just above the boundary layer 12 since, due to its density, it has to remain above the boundary layer 12, and consequently, it moves away sideways in the area of the outlet 25 of the heat storage fluid 11.

Since the rate of the horizontal flow 23 of liquid heat storage fluid 11 can be adjusted on the basis of the position of the boundary layer so that said fluid flows to the left and is subsequently introduced into the lower horizontal part 20 of the mixing container via the pipeline 16, then a flow of heat storage fluid 11 is induced in the area of the outlet 25 in the flow direction of the heat storage fluid 26, and this ensures that the solid and liquid heat storage fluids 11 are removed from the boundary layer 12 in the direction of the pipeline 4 or else the flow 23 (whose rate can be adjusted) constantly ensures that solid components of the heat storage fluid 11 cannot flow to the right along with a flow 24 of the heat transfer fluid 5 in the direction of the suction site of the heat transfer fluid 5 out of the lower horizontal part 20 of the mixing container and thus towards the pump 8, since this flow constantly pushes these components to the left in the direction of the outlet 25 and thus ultimately in the flow direction of the heat storage fluid 26 in the direction of the pipeline 4 and thus to the ice reservoir 2. For the sake of clarity, it should be pointed out that solid heat storage fluid 11, which can be situated in the boundary layer 12, is present in the horizontal flow 24 of the heat transfer fluid in a smaller volume quantity and, in the flow 23 of the heat storage fluid situated below that, in a larger volume quantity, so that a sufficiently strong flow 23 of the heat storage fluid ensures that solid heat storage fluid 11 is conveyed in the direction of the outlet 25 so as to leave the mixing container 3.

Figure 3:
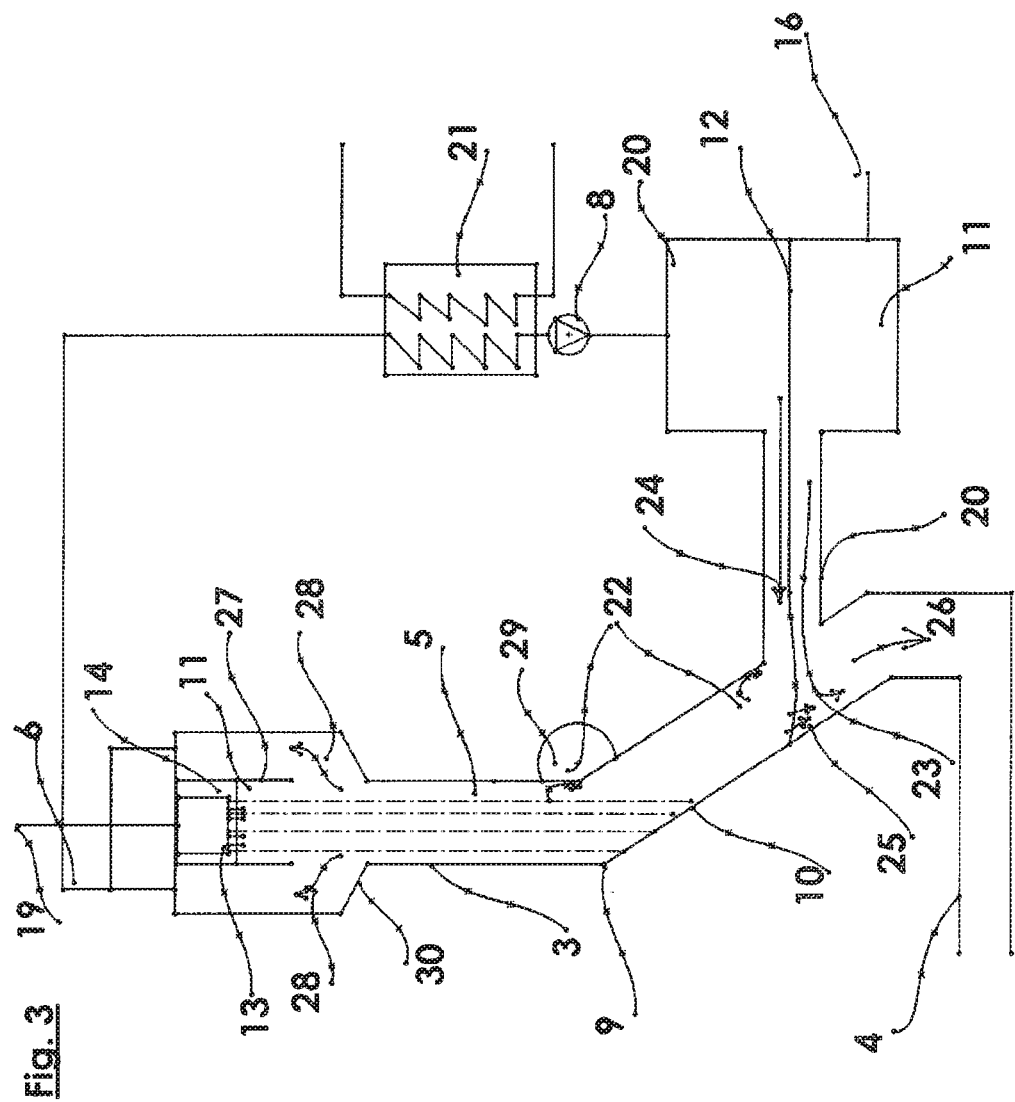
FIG. 3 illustrates another example of a portion of a latent heat storage unit with an ice reserviro.

The heat transfer fluid 5 and the heat storage fluid 11 can also be conveyed through the mixing container 3 in a countercurrent, whereby the heat storage fluid 11 retains its above-mentioned flow direction from the top to the bottom through the mixing container 3. This process is described below in FIG. 3.

Via a countercurrent in the middle and upper part of the mixing container 3, the heat exchange between the heat storage fluid 11 and the heat transfer fluid 5 is improved and, in particular, the mean retention time of the heat storage fluid 11 in the mixing container 3 can be influenced by means of the flow rate of the heat transfer fluid 5 in the mixing container 3 as well as by means of the size of the droplets dripped in by the dripping device 13. Heat transfer fluid 5 is introduced by the pump 8 into the lower horizontal part 20 of the mixing container, while heat storage fluid 11 is introduced there via the pipeline 16, and these fluids flow in a parallel current towards the left in the direction of the incline 10 (in this case, the horizontal flow 24 of the heat transfer fluid runs opposite to the case described in FIGS. 1 and 2), whereby the heat transfer fluid 5 subsequently flows at a slant upwards through the mixing container 3, while the flow 23 of the heat storage fluid is combined with the heat storage fluid 11, which is flowing from above over the incline 10 downwards through the boundary layer 12, and then exits downwards from the mixing container 3 as indicated by the flow direction 26, and flows in the direction of the pipeline 4 and through it further in the direction of the ice reservoir 2.

The flow rate of the heat transfer fluid 5 should be set here in such a way that the droplets of heat storage fluid 11 leaving the dripping device 13 can still move downwards within the mixing container 3 within the flow of heat storage fluid 5 that is moving upwards and can reach the incline 10 or, to put it in other words, these droplets have to be so large that, within the mixing container 3 at a given flow rate of the heat transfer fluid 5, they still reach the bottom; that is to say, the falling rate of the droplets of the heat storage fluid 11 within the heat transfer fluid 5 has to be greater than the flow rate of the heat transfer fluid 5 that counters this falling rate. Of course, this can also be influenced by the geometry of the mixing container 3, for example, in that the upper part of the mixing container 3 is rotated to the left, somewhat away from the perpendicular, counterclockwise in the view shown here. The recirculation zone 22 formed in FIG. 3 increases the mixing and the heat transfer in the mixing container 3. In the upper part of the mixing container 3, the heat transfer fluid 5 flows sideways upwards, as shown by the flow direction of the heat transfer fluid 28, up to the tip of the mixing container 3, where it leaves the mixing container 3. In this context, it must be ensured that, on the basis of the cross section design of the mixing container 3, the flow rates of the heat transfer fluid 5 are so low in the upper part 7 of the mixing container at the height of the bell 27 that liquid heat storage fluid 11 cannot leave the mixing container 3 via the pipeline 6 but rather it exits downwards from the upper part 7 of the mixing container, for example, concentrated above the incline 30.

The figures show the following:
1 latent heat storage unit
2 ice reservoir
3 mixing container
4 pipeline
5 heat transfer fluid
6 pipeline
7 upper part of the mixing container
8 pump
9 bend
10 incline
11 heat storage fluid
12 boundary layer
13 dripping device
14 gas space
15 pipe
16 pipeline
17 pump
18 heat exchanger
19 pipeline
20 lower horizontal part of the mixing container
21 heat exchanger
22 recirculation zone
23 flow of the heat storage fluid
24 horizontal flow of the heat transfer fluid
25 outlet
26 flow direction of the heat storage fluid
27 bell
28 flow direction of the heat transfer fluid
29 angle
30 incline
31 container
32 filling and emptying line
33 wall of the upper part of the mixing container

The invention claimed is:

1. A method for the operation of a mixing container and of an ice reservoir of a latent heat storage unit, whereby a heat storage fluid changes between a liquid phase and a solid phase and, when the heat storage fluid is in the liquid phase, the heat storage fluid is mixed with a heat transfer fluid, whereby melting heat is transferred between the heat storage fluid and the heat transfer fluid, whereby the liquid heat storage fluid is non-soluble in the heat transfer fluid and whereby the liquid heat storage fluid has a higher density than the heat transfer fluid, characterized in that
   a) via a gas space the heat storage fluid in an upper part of the mixing container is introduced into the heat transfer fluid,
   b) due to a flow of the heat storage fluid within a flow of the heat transfer fluid, heat is transferred from the heat storage fluid to the heat transfer fluid,
   c) via a flow deflection, the heat storage fluid is concentrated in liquid as well as solid form,
   d) the concentrated heat storage fluid flows through a boundary layer that is situated between the heat transfer fluid and the heat storage fluid,
   e) the heat storage fluid is withdrawn in the form of a second flow of the heat storage fluid below the boundary layer in the direction of an ice reservoir,
   f) in the ice reservoir, via a horizontal inflow of the heat storage fluid into the lower part of the ice reservoir, the solid and the liquid phases of the heat storage fluid are separated due to the density difference.

2. The method according to claim 1, characterized in that the heat storage fluid in the upper part of a mixing container is introduced in the form of droplets by means of a dripping device into the heat transfer fluid that is flowing around the bell via the gas space inside a bell, whereby the size of the gas space within the bell is adjustable.

3. The method according to claim 1, characterized in that the heat storage fluid in the upper part of a mixing container is introduced in the form of droplets by means of a dripping device into the heat transfer fluid via the gas space, whereby the heat transfer fluid first flows through a pipeline into a container that tightly encloses the upper part of the mixing container and then subsequently, flows through a liquid-permeable container wall into the upper part of the mixing container, whereby the gas space has a filling and emptying line by means of which the size of the gas space within the upper part of the mixing container can be adjusted.

4. The method according to claim 1, characterized in that, in a perpendicular or essentially perpendicular flow through the upper part of the mixing container and downwards through a pipe, the heat storage fluid mixes with the heat transfer fluid, which is likewise flowing downwards, so as to transfer heat from the heat storage fluid to the heat transfer fluid, as a result of which the heat storage fluid makes a partial transition into the solid aggregate state.

5. The method according to claim 1, characterized in that, in the lower part of the mixing container, via a flow deflection in the bend, the heat storage fluid is concentrated in liquid and solid form on an incline that runs at an angle of 92° to 178° with respect to the perpendicular, flowing downwards due to the heat storage fluids higher density relative to the heat transfer fluid as well as due to its flowing through this incline of the mixing container at the bottom of the incline, whereby the abrupt flow deflection in the bend can also take place in a more favorable manner by means of one or more partial elbows, so that, at the end of the flow deflection, heat transfer fluid and heat storage fluid flow at an angle of 92° to 178° with respect to the perpendicular.

6. The method according to claim 1, characterized in that the heat storage fluid, which is liquid in portions and solid in portions, is introduced through the boundary layer into a flow of heat storage fluid generated below the boundary layer when the heat storage fluid reaches the boundary layer, so that the heat storage fluid that penetrates the boundary layer is withdrawn in the area of the outlet by means of the flow of the heat storage fluid from the mixing container in the direction of the ice reservoir, whereas entrained portions of the heat transfer fluid once again rise upwards to the boundary layer due to their lower density as compared to the heat storage fluid, and they exit from the lower horizontal part of the mixing container in the form of a horizontal flow of the heat transfer fluid, whereby the flow of the heat transfer fluid is preferably generated in that heat storage fluid is constantly conveyed into the lower horizontal part of the mixing container via a pipeline, whereby moreover, the separation of heat transfer fluid and heat storage fluid is aided by the fact that the heat transfer fluid, coming from above, flows away sideways to the right due to its lower density since the heat storage fluid cannot flow through the boundary layer, and consequently the heat storage fluid flows away sideways from the separation area in the area of the outlet.

7. The method according to claim 1, characterized in that, in the ice reservoir, the solid and the liquid phases of the heat storage fluid are separated via a horizontal or essentially horizontal, inflow of the heat storage fluid into the solid and liquid phases at a small height above the bottom of the ice reservoir as a result of the density difference, because the lower density of the solid heat storage fluid allows the heat storage fluid to rise upwards in the ice reservoir, and the heat storage fluid is stored there, whereas the heat storage fluid in liquid form is once again fed via the pump into the circulation process at the bottom of the ice reservoir.

8. The method according to claim 1, characterized in that the heat transfer fluid is introduced into the lower horizontal part of the mixing container via the pump and from there, the heat storage fluid is conveyed above the boundary layer, in a parallel current with the heat storage fluid that is being conveyed below the boundary layer, and then in a counter-current relative to the heat storage fluid, the heat storage fluid flows to the upper part of the mixing container and the heat storage fluid leaves the latter through the pipeline, whereby the flow rate of the heat transfer fluid through the mixing container is so low that the entire amount of heat storage fluid moves downwards through the mixing container and, after accumulating on the incline, passes through the boundary layer and exits from the mixing container via the pipeline.

9. The method according to claim 1, characterized in that, by means of one or more deflections, the flow path of the heat transfer fluid and of the heat storage fluid is configured in such a way that, above the boundary layer, one or more recirculation zones are formed in which both fluids can circulate, so that the retention time of the heat storage fluid in the heat transfer fluid is increased, thereby improving the heat transfer from the heat storage fluid to the heat transfer fluid.

10. The device for mixing and de-mixing a heat transfer fluid and a heat storage fluid as two liquids that have different densities and that are not soluble in each other, having a mixing container and an ice reservoir, and comprising:
a) a dripping device in the upper part of the mixing container for dripping in a heat storage fluid via a gas space that is formed above a heat transfer fluid situated in the upper part of the mixing container, so that the dripping device does not come into contact with the heat transfer fluid,
b) an adjoining perpendicular or essentially perpendicular pipe section in the mixing container that then, with a direction change, makes a transition to a pipe section that is at an angle of 92° to 178° with respect to the perpendicular, so as to form an incline, whereby the direction change of the pipe can be effectuated by a bend or else by one or more elbows,
c) a horizontal or almost horizontal pipe with an adjoining container that laterally adjoins the pipe with an incline and that forms the lower horizontal part of the mixing container that is filled with heat transfer fluid or emptied of heat transfer fluid by means of a pump, and that is filled with heat storage fluid via a pipeline.

11. The device according to claim 10, characterized in that the lower horizontal part of the mixing container in the area of the pump and of the pipeline is configured by a cross section enlargement in such a way that the heat transfer fluid can flow above the boundary layer and so that the heat storage fluid as well can flow below the boundary layer.

12. The device according to claim 10, characterized in that the upper part of the mixing container has a bell.

13. The device according to claim 10, characterized in that the mixing container is connected to the ice reservoir via a descending or horizontally positioned or ascending pipeline.

14. The device according to claim 10, characterized in that the upper part of the mixing container is surrounded by an additional container that sealingly encloses the upper part of the mixing container so that the heat transfer fluid can be first introduced via the pipeline into the container and from there, via a permeable wall, into the upper part of the mixing container.

15. The device according to claim 10, characterized in that the geometry of the mixing container is configured in such a way that, when fluid is flowing through the mixing container, recirculation zones can form in the mixing container, resulting in a longer retention time for the heat storage fluid in the mixing container and thus in the heat transfer fluid that fills primarily the mixing container, so that a better heat transfer from the heat storage fluid to the heat transfer fluid is made possible.

* * * * *